United States Patent
Chen et al.

(10) Patent No.: US 10,575,065 B2
(45) Date of Patent: Feb. 25, 2020

(54) MESSAGE SENDING METHOD AND DEVICE, CODE STREAM PROCESSING METHOD AND DEVICE

(71) Applicant: ZTE Corporation, Shenzhen (CN)

(72) Inventors: Anqing Chen, Shenzhen (CN); Wei Xiong, Shenzhen (CN); Yingchuan Chen, Shenzhen (CN); Yi Ding, Shenzhen (CN); Xiaoqu Zhang, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 137 days.

(21) Appl. No.: 15/568,057

(22) PCT Filed: Apr. 20, 2016

(86) PCT No.: PCT/CN2016/079770
§ 371 (c)(1),
(2) Date: Oct. 20, 2017

(87) PCT Pub. No.: WO2016/169482
PCT Pub. Date: Oct. 27, 2016

(65) Prior Publication Data
US 2018/0146261 A1    May 24, 2018

(30) Foreign Application Priority Data

Apr. 20, 2015 (CN) .......................... 2015 1 0188537

(51) Int. Cl.
*G06F 11/20* (2006.01)
*H04N 21/647* (2011.01)
(Continued)

(52) U.S. Cl.
CPC ..... *H04N 21/6473* (2013.01); *G06F 11/2023* (2013.01); *H04L 12/1868* (2013.01);
(Continued)

(58) Field of Classification Search
CPC ............. G06F 11/2023; G06F 11/2038; H04L 41/0654; H04L 12/1877; H04L 12/1868
See application file for complete search history.

(56) References Cited

U.S. PATENT DOCUMENTS 7,299,291 B1 * 11/2007 Shaw .................. H04L 65/4069
709/203
9,138,644 B2 * 9/2015 Perlman .................. A63F 13/12
(Continued)

FOREIGN PATENT DOCUMENTS

CN    1011462215 A    3/2008
CN    101252546 A    8/2008
(Continued)

OTHER PUBLICATIONS

International Search Report for corresponding application PCT/CN2016/079770 filed on Apr. 20, 2016; dated Jul. 12, 2016.
(Continued)

*Primary Examiner* — Nadeem Iqbal
(74) *Attorney, Agent, or Firm* — Cantor Colburn LLP

(57) ABSTRACT

A message sending method and device, and a code stream processing method and device are provided. In the message sending method, a first server acquires and caches a code stream which is the same as a code stream of a second server; the first server acquires an initial position for sending the code stream; and after the second server stops sending the code stream, the first server constructs a message corresponding to the code stream, and sends the message starting from the initial position according to a source Internet Protocol (IP) address of the second server.

18 Claims, 6 Drawing Sheets

(51) Int. Cl.
*H04N 21/6405* (2011.01)
*H04L 12/18* (2006.01)
*H04L 12/24* (2006.01)
*H04L 29/08* (2006.01)
*H04L 29/14* (2006.01)
*H04N 21/218* (2011.01)
*H04L 29/06* (2006.01)
*H04N 21/643* (2011.01)

(52) U.S. Cl.
CPC ...... *H04L 41/0654* (2013.01); *H04L 67/1023* (2013.01); *H04L 69/40* (2013.01); *H04N 21/2181* (2013.01); *H04N 21/6405* (2013.01); *H04L 65/4076* (2013.01); *H04L 69/22* (2013.01); *H04N 21/64322* (2013.01)

(56) References Cited

U.S. PATENT DOCUMENTS 9,641,579 B2* 5/2017 Gouache ................ H04L 65/60
2005/0097391 A1 5/2005 Boyd
2007/0174491 A1* 7/2007 Still .................... H04L 63/0281
709/246
2008/0111231 A1 5/2008 Hu
2010/0138531 A1* 6/2010 Kashyap ............... H04L 65/608
709/224
2016/0329987 A1* 11/2016 Pang ..................... H04L 1/0045

FOREIGN PATENT DOCUMENTS

| | | |
|---|---|---|
| CN | 101340428 A | 1/2009 |
| CN | 101729909 A | 6/2010 |
| CN | 103181143 A | 6/2013 |
| CN | 104811827 A | 7/2015 |
| WO | 02067120 A1 | 8/2002 |

OTHER PUBLICATIONS

European Search Report for corresponding application EP16782629; Report dated May 3, 2018.

* cited by examiner

MESSAGE SENDING METHOD AND DEVICE, CODE STREAM PROCESSING METHOD AND DEVICE

TECHNICAL FIELD

The disclosure relates to the field of communications, for example, to a message sending method and device, and a code stream processing method and device.

BACKGROUND

Along with the development of sciences and technologies, various terminals bring great convenience to the lives of people, for example, an Internet Protocol Television (IPTV). The IPTV is a new technology integrating technologies of Internet, multimedia, communications and the like by virtue of a broadband network and providing multiple kinds of interactive service including a digital television for home users. By virtue of current technologies, a user may execute operations of video on demand and the like besides watching conventional live channels, and such service may be provided by a server of an Internet Service Provider (ISP).

A sending server of a code stream of a channel may be found to have a problem. For example, a memory bank may be required to be replaced, a hard disk where an operating system is located may need to be replaced and a software version may need to be upgraded and replaced. Under these conditions, it may be needed to interrupt a service, delete the channel and then recreate the code stream of the channel on another server for service provision. The completion of these operations may usually take a period of time, for example, 5-10 minutes. In this period, a user may face a blank screen because there is no code stream in a multicast group. For avoiding excessively great impact on a user, a passage, which is often read and displayed on a terminal, may usually be displayed on the terminal in advance, for example, "We will temporarily stop providing service for maintenance in a certain time period". Under such a condition, the service has to be interrupted.

From the above technical solution, it can be seen that a service interruption method may have the following shortcomings:

1. Occurrence of blank screen may bring a very poor watching experience to the user.

2. An operation time period may be limited. For controlling an influence range of blank screen, the operation may be suggested to be executed at a moment when there are fewer watching users, for example, the operation may be executed at 2-3 o'clock in the morning. Although recreation usually requires a short time, from the perspective of risk prevention, influence time may usually exceed 10 minutes. Moreover, manual intervention may be required to prevent an excessively long interruption time caused by a service abnormity.

3. Loss of the service may be caused. Although the operation is executed at the moment when there are fewer watching users, if the operation is executed in a commercial break, loss of revenues from advertising may also occur.

Thus it can be seen that migration of a multicast channel may cause a service interruption.

For a problem of incapability in implementing migration of a multicast channel without service interruption, there is yet no effective solution at present.

SUMMARY

Some exemplary embodiments of the disclosure provide a message sending method and device, and a code stream processing method and device, which may at least solve a problem of incapability in implementing migration of a multicast channel without service interruption.

A message sending method is provided, which may include the following acts.

A first server may acquire and cache a code stream which is substantially the same as a code stream of a second server.

The first server may acquire an initial position for sending the code stream.

After the second server stops sending the code stream, the first server may construct a message corresponding to the code stream, and may send the message starting from the initial position according to a source Internet Protocol (IP) address of the second server.

In an exemplary embodiment, the act that the first server sends the message according to the source IP address of the second server may include one of the following acts.

The first server may add a local route to send the message by virtue of the source IP address of the second server.

The first server may fill the source IP address of the second server into an IP address field of the message, and may send the message.

In an exemplary embodiment, before the act that the first server acquires and caches the code stream which is substantially the same as the code stream of the second server, the method may further include the following act.

The first server may receive a notification message sent by a Service Control Unit (SCU). In the exemplary embodiment, the notification message may be used for notifying the first server to acquire code stream information. The code stream information may be used by the first server for acquiring and caching the code stream. The code stream information may include at least one of the following information: a source of the code stream, a protocol type of the code stream, a starting position of caching the code stream and information of the second server.

In an exemplary embodiment, after the act that the first server acquires and caches the code stream which is substantially the same as the code stream of the second server, the method may further include the following act.

The first server may notify the SCU of an acquisition result of acquiring the code stream. In the exemplary embodiment, the acquisition result may be used by the SCU for judging whether to reselect a server for replacing the second server or not, and after determining that it is not needed to reselect the server, the SCU may send information of the first server to the second server.

In an exemplary embodiment, after the act that the first server constructs the message corresponding to the code stream and sends the message starting from the initial position according to the source IP address of the second server, the method may further include the following act.

The first server may report a sending result of sending the message to the SCU.

In an exemplary embodiment, the act that the first server acquires the code stream which is substantially the same as the code stream of the second server may include at least one of the following acts.

The first server may acquire the code stream from another server except the second server.

The first server may acquire the code stream from storage equipment configured to store the code stream.

In an exemplary embodiment, the act that the first server acquires the initial position for sending the code stream may include at least one of the following acts.

The first server may acquire the initial position in a manner of negotiating with the second server.

The first server may acquire the initial position which is preset.

A code stream processing method is provided, which may include the following acts.

A second server may receive a message sent by an SCU, and the message may be used for notifying the second server that a first server is to replace the second server to send a code stream.

The second server may acquire an initial position for sending the code stream by the first server.

The second server may stop sending the code stream at the initial position.

In an exemplary embodiment, the act that the second server acquires the initial position for sending the code stream by the first server may include the following act.

The second server may acquire the initial position in a manner of negotiating with the first server.

In an exemplary embodiment, the act that the second server receives the message sent by the SCU may include the following act.

The second server may receive, in a manner of interacting with the SCU about real-time information of the code stream, the message sent by the SCU. In the exemplary embodiment, the real-time information of the code stream may be used by the SCU for sending a notification message to the first server. The notification message may be used for notifying the first server to acquire and cache the code stream which is substantially the same as the code stream of the second server, acquire the initial position for sending the code stream, and after the second server stops sending the code stream, construct a message corresponding to the code stream and send the message starting from the initial position according to a source IP address of the second server.

In an exemplary embodiment, the notification message may notify the first server to acquire and cache the code stream which is substantially the same as the code stream of the second server in a manner of notifying the first server to acquire code stream information. The code stream information may include at least one of the following information: a source of the code stream, a protocol type of the code stream, a starting position of caching the code stream and information of the second server.

A code stream processing method is provided, which may include the following acts.

An SCU may notify a first server to acquire and cache a code stream which is substantially the same as a code stream of a second server.

After receiving, from the first server, information indicating normal acquisition of the code stream, the SCU may send information of the first server to the second server. In the exemplary embodiment, the information of the first server may be used for determining an initial position for sending the code stream by the first server.

In an exemplary embodiment, the initial position may be determined through negotiation performed by the second server with the first server according to the information of the first server.

In an exemplary embodiment, the act that the SCU notifies the first server to acquire and cache the code stream which is substantially the same as the code stream of the second server may include the following acts.

The SCU may interact with the second server about real-time information of the code stream.

The SCU may send a notification message to the first server according to the real-time information of the code stream. In the exemplary embodiment, the notification message may be used for notifying the first server to acquire and cache the code stream which is substantially the same as the code stream of the second server. In the exemplary embodiment, the notification message may further be used for notifying the first server to acquire the initial position for sending the code stream, and after the second server stops sending the code stream, construct a message corresponding to the code stream and send the message starting from the initial position according to a source IP address of the second server.

In an exemplary embodiment, the notification message may notify the first server to acquire and cache the code stream which is substantially the same as the code stream of the second server in a manner of notifying the first server to acquire code stream information.

In the exemplary embodiment, the code stream information may include at least one of the following information: a source of the code stream, a protocol type of the code stream, a starting position of caching the code stream and information of the second server.

In an exemplary embodiment, the method may further include the following act.

After receiving, from the first server, information indicating acquisition abnormality of the code stream, the SCU may select a third server to replace the second server.

In an exemplary embodiment, after the act that the SCU sends the information of the first server to the second server, the method may further include the following act.

A sending result reported by the first server may be received. In this exemplary embodiment, the sending result may be a sending result of sending the message by the first server.

A message sending device is provided, which may be applied to a first server and include: a first acquisition module, a second acquisition module and a first sending module.

The first acquisition module may be configured to acquire and cache a code stream which is substantially the same as a code stream of a second server.

The second acquisition module may be configured to acquire an initial position for sending the code stream.

The first sending module may be configured to, after the second server stops sending the code stream, construct a message corresponding to the code stream, and send the message starting from the initial position according to a source IP address of the second server.

In an exemplary embodiment, the first sending module may be configured to:

add a local route to send the message by virtue of the source IP address of the second server; or, fill the source IP address of the second server into an IP address field of the message, and send the message.

In an exemplary embodiment, the device may further include a first receiving module.

The first receiving module may be configured to receive a notification message sent by an SCU. In the exemplary embodiment, the notification message may be used for notifying the first server to acquire code stream information. The code stream information may be used by the first server for acquiring and caching the code stream. The code stream information may include at least one of the following information: a source of the code stream, a protocol type of the code stream, a starting position of caching the code stream and information of the second server.

In an exemplary embodiment, the device may further include a first notification module.

The first notification module may be configured to notify the SCU of an acquisition result of acquiring the code stream. The acquisition result may be used by the SCU for judging whether to reselect a server for replacing the second server or not, and after determining that it is not needed to reselect the server, the SCU may send information of the first server to the second server.

In an exemplary embodiment, the device may further include a reporting module.

The reporting module may be configured to report a sending result of sending the message to the SCU.

In an exemplary embodiment, the first acquisition module may be configured to acquire the code stream in at least one of the following manners:

acquiring the code stream from another server except the second server.

acquiring the code stream from storage equipment configured to store the code stream.

In an exemplary embodiment, the second acquisition module may be configured to acquire the initial position in at least one of the following manners:

acquiring the initial position in a manner of negotiating with the second server.

acquiring the initial position which is preset.

A code stream processing device is provided, which may be applied to a second server and include: a second receiving module, a third acquisition module and a stopping module.

The second receiving module may be configured to receive a message sent by an SCU, and the message may be used for notifying the second server that a first server is to replace the second server to send a code stream.

The third acquisition module may be configured to acquire an initial position for sending the code stream by the first server.

The stopping module may be configured to stop sending the code stream at the initial position.

In an exemplary embodiment, the third acquisition module may be configured to:

acquire the initial position in a manner of negotiating with the first server.

In an exemplary embodiment, the second receiving module may be configured to:

receive, in a manner of interacting with the SCU about real-time information of the code stream, the message sent by the SCU. The real-time information of the code stream may be used by the SCU for sending a notification message to the first server. The notification message may be used for notifying the first server to acquire and cache the code stream which is substantially the same as the code stream of the second server, acquire the initial position for sending the code stream, and after the second server stops sending the code stream, construct a message corresponding to the code stream and send the message starting from the initial position according to a source IP address of the second server.

In an exemplary embodiment, the notification message may notify the first server to acquire and cache the code stream which is substantially the same as the code stream of the second server in a manner of notifying the first server to acquire code stream information. The code stream information may include at least one of the following information: a source of the code stream, a protocol type of the code stream, a starting position of caching the code stream and information of the second server.

A code stream processing device is provided, which may be applied to an SCU and include: a second notification module and a second sending module.

The second notification module may be configured to notify a first server to acquire and cache a code stream which is substantially the same as a code stream of a second server.

The second sending module may be configured to, after information indicating normal acquisition of the code stream may be received from the first server, send the information of the first server to the second server. The information of the first server may be used for determining an initial position for sending the code stream by the first server.

In an exemplary embodiment, the initial position may be determined through negotiation performed by the second server with the first server according to the information of the first server.

In an exemplary embodiment, the second notification module may include: an interaction unit and a sending unit.

The interaction unit may be configured to interact with the second server about real-time information of the code stream.

The sending unit may be configured to send a notification message to the first server according to the real-time information of the code stream. The notification message may be used for notifying the first server to acquire and cache the code stream which is substantially the same as the code stream of the second server. The notification message may further be used for notifying the first server to acquire the initial position for sending the code stream, and after the second server stops sending the code stream, construct a message corresponding to the code stream and send the message starting from the initial position according to a source IP address of the second server.

In an exemplary embodiment, the notification message may notify the first server to acquire and cache the code stream which is substantially the same as the code stream of the second server in a manner of notifying the first server to acquire code stream information. The code stream information may include at least one of the following information: a source of the code stream, a protocol type of the code stream, a starting position of caching the code stream and information of the second server.

In an exemplary embodiment, the device may further include a selection module.

The selection module may be configured to, after information indicating acquisition abnormality of the code stream may be received from the first server, select a third server to replace the second server.

In an exemplary embodiment, the device may further include a third receiving module.

The third receiving module may be configured to receive a sending result reported by the first server. The sending result may be a sending result of sending the message by the first server.

A computer-readable storage medium is provided, which may store computer-executable instructions, the computer-executable instructions being configured to execute the abovementioned methods.

By virtue of the solutions in some exemplary embodiments of the disclosure, a problem of incapability in implementing migration of a multicast channel without service interruption may be solved, and an effect of migrating the multicast channel without service interruption may be achieved.

DETAILED DESCRIPTION OF THE EMBODIMENTS

It is important to note that terms "first", "second" and the like in the specification, claims and drawings of the disclosure are adopted not to describe a specific sequence or order but to distinguish similar objects.

Figure 1:
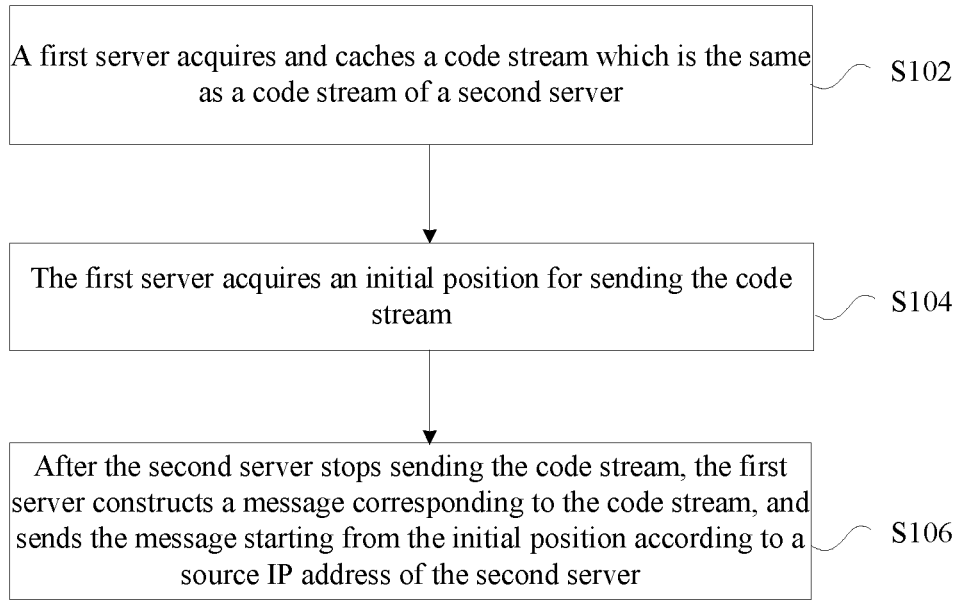
FIG. 1 is a flowchart of a message sending method according to an exemplary embodiment of the disclosure.

An exemplary embodiment provides a message sending method. FIG. 1 is a flowchart of a message sending method according to an exemplary embodiment of the disclosure. As shown in FIG. 1, the flow may include the following acts:

At act S102, a first server may acquire and cache a code stream which is substantially the same as a code stream of a second server.

At act S104, the first server may acquire an initial position for sending the code stream. In some exemplary embodiments, the position may be a timestamp on a time axis, and may alternatively be a message number.

At act S106, after the second server stops sending the code stream, the first server may construct a message corresponding to the code stream, and may send the message starting from the initial position according to a source IP address of the second server.

By the acts, when the second server is required to be replaced, the first server may send the message corresponding to the code stream according to the source IP address of the second server, thereby implementing seamless migration of a multicast channel. A problem of incapability in implementing migration of the multicast channel without service interruption may be solved and an effect of migrating the multicast channel without service interruption may be achieved.

A key for implementing seamless migration of the multicast channel may be a source IP. Keeping the source IP unchanged may ensure stability of the code stream. In an exemplary embodiment, the act that the first server sends the message according to the source IP address of the second server may be implemented in one of the following manners. The first server may add a local route to send the message by virtue of the source IP address of the second server, for example, the route may be added by virtue of a command ip route add local IP_A dev lo tab local. Alternatively, the first server may fill the source IP address of the second server into an IP address field of the message, and may send the message. Of course, besides the two manners, processing of sending the message according to the source IP address of the second server may alternatively be implemented by virtue of any other manner as long as a source IP address for sending the message is the source IP address of the second server.

When acquiring and caching the code stream, the first server may execute a related operation according to a notification message sent by an SCU. In an exemplary embodiment, before the act that the first server acquires and caches the code stream which is substantially the same as the code stream of the second server, the method may further include the following act. The first server may receive the notification message sent by the SCU. In the exemplary embodiment, the notification message may be used for notifying the first server to acquire code stream information. The code stream information may be used by the first server for acquiring and caching the code stream. The code stream information may include at least one of the following information: a source of the code stream, a protocol type of the code stream, a starting position of caching the code stream and information of the second server.

From the above exemplary embodiment, it can be seen that, after the second server stops sending the code stream, the first server may replace the second server to continue sending the code stream. A premise for enabling the first server to replace the second server may be that the first server can acquire the code stream which is substantially the same as the code stream of the second server. If the first server cannot acquire the code stream, another server may replace the second server. In an exemplary embodiment, after the act that the first server acquires and caches the code stream which is substantially the same as the code stream of the second server, the method may further include the following act. The first server may notify the SCU of an acquisition result of acquiring the code stream. The acquisition result may be used by the SCU for judging whether to reselect a server for replacing the second server or not. After determining that it is not needed to reselect the server, the SCU may send information of the first server to the second server.

In an exemplary embodiment, after the act that the first server constructs the message corresponding to the code stream and sends the message starting from the initial position according to the source IP address of the second server, the method may further include the following act: The first server may report a sending result of sending the message to the SCU. Until the completion of this act, a migration process of the channel is finished, and the subsequent code stream may all be provided by the first server. After the second server returns to normal, the second server may continue sending the code stream, that is, the second server which returns to normal may replace the first server, and a replacement operation may similarly adopt the above-mentioned process.

When the first server acquires the code stream which is substantially the same as the code stream of the second server, multiple acquisition manners may be adopted. In an exemplary embodiment, the following acquisition manners may be adopted. The first server may acquire the code stream from another server except the second server. Alternatively, the first server may acquire the code stream from storage equipment configured to store the code stream.

The first server may acquire the initial position for sending the code stream in multiple acquisition manners. In an exemplary embodiment, the initial position may be acquired in any of the following manners. The first server may acquire the initial position in a manner of negotiating with the second server. Alternatively, the first server may acquire the initial position which is preset.

Figure 2:
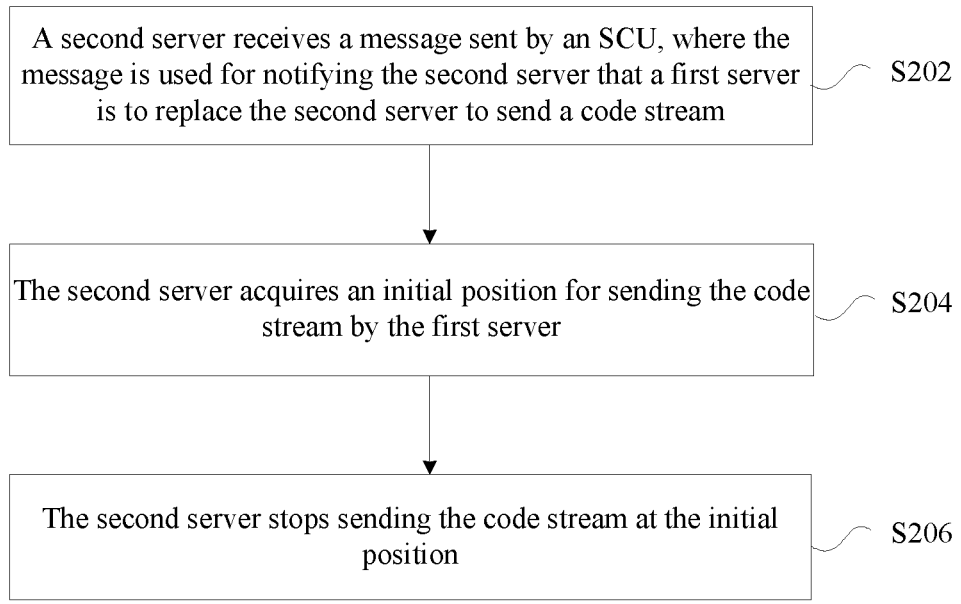
FIG. 2 is a flowchart of a first code stream processing method according to an exemplary embodiment of the disclosure.

FIG. 2 is a flowchart of a first code stream processing method according to an exemplary embodiment of the disclosure. As shown in FIG. 2, the flow may include the following acts:

At act S202, a second server may receive a message sent by an SCU. The message may be used for notifying the second server that a first server is to replace the second server to send a code stream.

At act 204, the second server may acquire an initial position for sending the code stream by the first server.

At act S206, the second server may stop sending the code stream at the initial position.

By the acts, when the second server is to be replaced, the first server may replace the second server to send the code stream, the initial position for sending the code stream may be acquired, and the first server may send the code stream starting from the initial position, thereby implementing seamless migration of a multicast channel. By virtue of the solution, a problem of incapability in implementing migration of the multicast channel without service interruption may be solved and an effect of migrating the multicast channel without service interruption may be achieved.

Multiple manners may be adopted to acquire the initial position for sending the code stream. In an exemplary embodiment, the initial position may be acquired in a manner of negotiation between the first server and the second server.

In an exemplary embodiment, the act that the second server receives the message sent by the SCU may include the following acts. The second server may receive, in a manner of interacting with the SCU about real-time information of the code stream, the message sent by the SCU. The real-time information of the code stream may be used by the SCU for sending a notification message to the first server. The notification message may be used for notifying the first server to acquire and cache the code stream which is substantially the same as the code stream of the second server, acquire the initial position for sending the code stream, and after the second server stops sending the code stream, construct a message corresponding to the code stream and send the message starting from the initial position according to a source IP address of the second server.

In an exemplary embodiment, the notification message may notify the first server to acquire and cache the code stream which is substantially the same as the code stream of the second server in a manner of notifying the first server to acquire code stream information. The code stream information may include at least one of the following information: a source of the code stream, a protocol type of the code stream, a starting position of caching the code stream and information of the second server.

Figure 3:
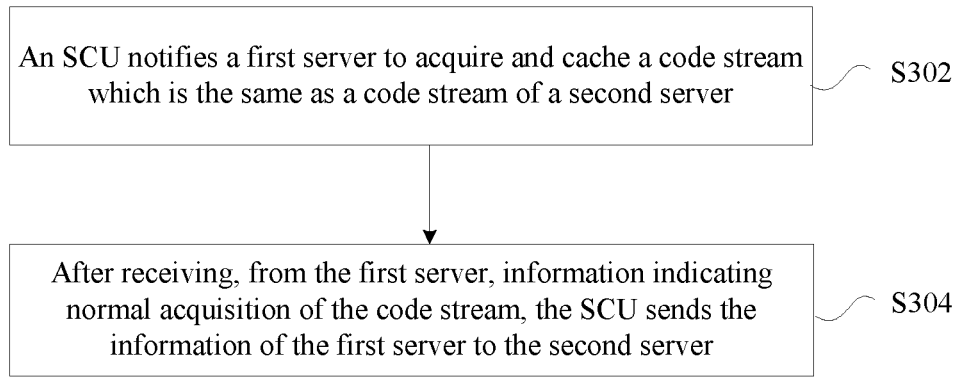
FIG. 3 is a flowchart of a second code stream processing method according to an exemplary embodiment of the disclosure.

FIG. 3 is a flowchart of a second code stream processing method according to an exemplary embodiment of the disclosure. As shown in FIG. 3, the flow may include the following acts.

At act S302, an SCU may notify a first server to acquire and cache a code stream which is substantially the same as a code stream of a second server.

At act S304, after receiving, from the first server, information indicating normal acquisition of the code stream, the SCU may send the information of the first server to the second server.

By the acts, when the second server is required to be replaced, the SCU may notify the first server to acquire and cache the code stream which is substantially the same as the code stream of the second server, and the first server may send the code stream from a determined initial position for sending the code stream, thereby implementing seamless migration of a multicast channel. By virtue of the solution, a problem of incapability in implementing migration of the multicast channel without service interruption may be solved and an effect of migrating the multicast channel without service interruption may be achieved.

In an exemplary embodiment, the initial position for sending the code stream may be determined through negotiation performed by the second server with the first server according to the information of the first server.

When the SCU notifies the first server to acquire and cache the code stream which is substantially the same as the code stream of the second server, the following implementation manner may be adopted. The SCU may interact with the second server about real-time information of the code stream; and the SCU may send a notification message to the first server according to the real-time information of the code stream. The notification message may be used for notifying the first server to acquire and cache the code stream which is substantially the same as the code stream of the second server. The notification message is further used for notifying the first server to acquire the initial position for sending the code stream, and after the second server stops sending the code stream, construct a message corresponding to the code stream and send the message starting from the initial position according to a source IP address of the second server.

In an exemplary embodiment, the notification message may notify the first server to acquire and cache the code stream which is substantially the same as the code stream of the second server in a manner of notifying the first server to acquire code stream information. The code stream information may include at least one of the following information: a source of the code stream, a protocol type of the code stream, a starting position of caching the code stream and information of the second server.

The SCU may select a server for replacing the second server. After selecting a server incapable of taking over a service of the second server, the SCU may further select another one. In an exemplary embodiment, after receiving, from the first server, information indicating acquisition abnormity of the code stream, the SCU may select a new server for replacing the second server.

In an exemplary embodiment, after the act that the SCU sends the information of the first server to the second server, the method may further include the following act: A sending result reported by the first server may be received. The sending result is a sending result of sending the message by the first server. Until completion of this act, the whole channel migration process is finished, and the subsequent code stream may be provided by the first server. After the second server returns to normal, the second server may continue sending code streams.

From the above descriptions about the implementation modes, those skilled in the art may clearly learn about that the methods according to the abovementioned exemplary embodiments may be implemented in a manner of combining software and a universal hardware platform, and of course, may alternatively be implemented through hardware. Based on such an understanding, the exemplary embodiments of the disclosure may be embodied in a form of software product, and the computer software product may be stored in a storage medium (such as a Read-Only Memory (ROM)/Random Access Memory (RAM), a magnetic disk and an optical disk), including instructions configured to enable computer equipment (which may be a mobile phone, a computer, a server, network equipment or the like) to execute the methods of the exemplary embodiments of the disclosure.

An exemplary embodiment provides a message sending device. The device may be configured to implement the abovementioned exemplary embodiment, and what has been described will not be elaborated. For example, term "module", used below, may be a combination of software and/or hardware capable of realizing a preset function. Although the device described in the following exemplary embodiment may be implemented with software, implementation with hardware or a combination of the software and the hardware is also possible and conceivable.

Figure 4:
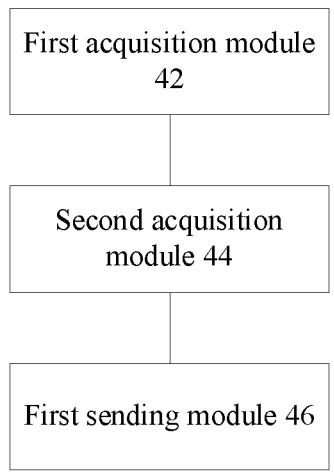
FIG. 4 is a structure block diagram of a message sending device according to an exemplary embodiment of the disclosure.

FIG. 4 is a structure block diagram of a message sending device according to an exemplary embodiment of the disclosure. As shown in FIG. 4, the device may be applied to a first server, and may include a first acquisition module 42, a second acquisition module 44 and a first sending module 46. The device will be described below.

The first acquisition module 42 may be configured to acquire and cache a code stream, which is substantially the same as a code stream of a second server. The second acquisition module 44 may be coupled to the first acquisition module 42, and may be configured to acquire an initial position for sending the code stream. The first sending module 46 may be coupled to the second acquisition module 44, and may be configured to, after the second server stops sending the code stream, construct a message corresponding to the code stream, and send the message starting from the initial position according to a source IP address of the second server.

In an exemplary embodiment, the first sending module 46 may send the message according to a source IP address of the second server in the following manner. The first server may add a local route to send the message by virtue of the source IP address of the second server. Alternatively, the first server may fill the source IP address of the second server into an IP address field of the message, and send the message.

Figure 5:
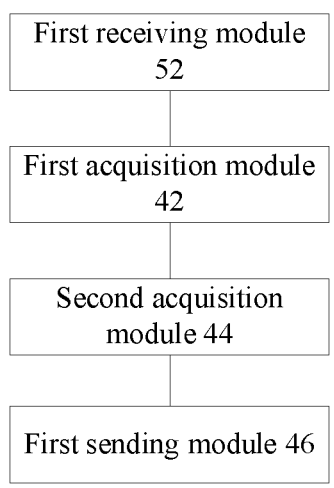
FIG. 5 is a first exemplary structure block diagram of a message sending device according to an exemplary embodiment of the disclosure.

FIG. 5 is a first structure block diagram of a message sending device according to an exemplary embodiment of the disclosure. As shown in FIG. 5, the device may further include a first receiving module 52, besides the modules shown in FIG. 4. The device will be described below.

The first receiving module 52 may be coupled to the first acquisition module 42, and may be configured to receive a notification message sent by an SCU. The notification message may be used for notifying the first server to acquire code stream information. The code stream information may be used by the first server for acquiring and caching the code stream. The code stream information may include at least one of the following information: a source of the code stream, a protocol type of the code stream, a starting position of caching the code stream and information of the second server.

Figure 6:
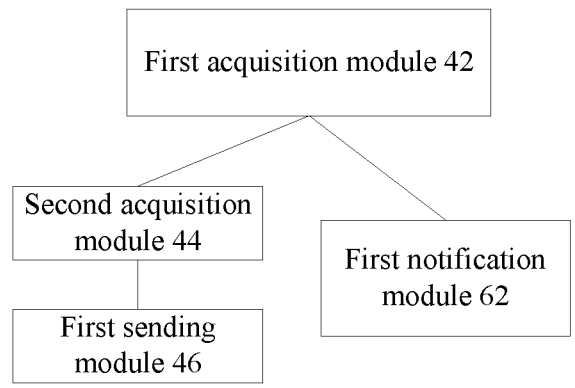
FIG. 6 is a second exemplary structure block diagram of a message sending device according to an exemplary embodiment of the disclosure.

FIG. 6 is a second structure block diagram of a message sending device according to an exemplary embodiment of the disclosure. As shown in FIG. 6, the device may further include a first notification module 62, besides the modules shown in FIG. 4. The device will be described below.

The first notification module 62 may be coupled to the first acquisition module 42, and may be used for notifying the SCU of an acquisition result of acquiring the code stream. The acquisition result may be used by the SCU for judging whether to reselect a server for replacing the second server or not, and after determining that it is not needed to reselect the server, the SCU may send information of the first server to the second server.

Figure 7:
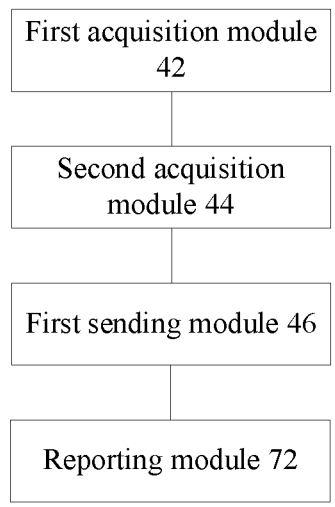
FIG. 7 is a third exemplary structure block diagram of a message sending device according to an exemplary embodiment of the disclosure.

FIG. 7 is a third structure block diagram of a message sending device according to an exemplary embodiment of the disclosure. As shown in FIG. 7, the device may further include a reporting module 72, besides the modules shown in FIG. 4. The device will be described below.

The reporting module 72 may be coupled to the first sending module 46, and may be configured to report a sending result of sending the message to the SCU.

In an exemplary embodiment, the first acquisition module 42 may acquire the code stream in at least one of the following manners: The first server may acquire the code stream from another server except the second server. The first server may acquire the code stream from storage equipment configured to store the code stream.

In an exemplary embodiment, the second acquisition module 44 may acquire the initial position in at least one of the following manners. The first server may acquire the initial position in a manner of negotiating with the second server. The first server may acquire the initial position which is preset.

Figure 8:
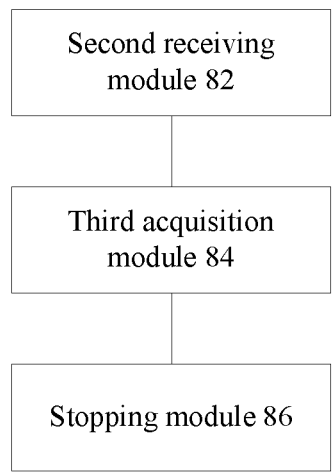
FIG. 8 is a structure block diagram of a first code stream processing device according to an exemplary embodiment of the disclosure.

FIG. 8 is a structure block diagram of a first code stream processing device according to an exemplary embodiment of the disclosure. As shown in FIG. 8, the device may be applied to a second server, and may include a second receiving module 82, a third acquisition module 84 and a stopping module 86. The device will be described below.

The second receiving module 82 may be configured to receive a message sent by an SCU, and the message may be used for notifying the second server that a first server is to replace the second server to send a code stream. The third acquisition module 84 may be coupled to the second acquisition module 82, and may be configured to acquire an initial position for sending the code stream by the first server. The stopping module 86 may be coupled to the third acquisition module 84, and may be configured to stop sending the code stream at the initial position.

In an exemplary embodiment, the third acquisition module 84 may be further configured to: acquire the initial position in a manner of negotiating with the first server.

The second receiving module 82 may be configured to receive, in a manner of interacting with the SCU about real-time information of the code stream, the message sent by the SCU. The real-time information of the code stream may be used by the SCU for sending a notification message to the first server. The notification message may be used for notifying the first server to acquire and cache the code stream which is substantially the same as the code stream of the second server, acquire the initial position for sending the code stream, and after the second server stops sending the code stream, construct a message corresponding to the code stream and send the message starting from the initial position according to a source IP address of the second server.

In an exemplary embodiment, the notification message may notify the first server to acquire and cache the code stream which is substantially the same as the code stream of the second server in a manner of notifying the first server to acquire code stream information. The code stream information may include at least one of the following information: a source of the code stream, a protocol type of the code stream, a starting position of caching the code stream and information of the second server.

Figure 9:
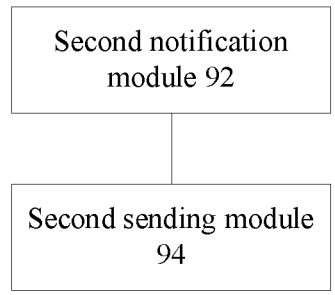
FIG. 9 is a structure block diagram of a second code stream processing device according to an exemplary embodiment of the disclosure.

FIG. 9 is a structure block diagram of a second code stream processing device according to an exemplary embodiment of the disclosure. As shown in FIG. 9, the device may be applied to an SCU, and may include a second notification module 92 and a second sending module 94. The device will be described below.

The second notification module 92 may be configured to notify a first server to acquire and cache a code stream which is substantially the same as a code stream of a second server. The second sending module 94 may be coupled to the second notification module 92, and may be configured to, after information indicating normal acquisition of the code stream is received from the first server, send the information of the first server to the second server, wherein the information of the first server may be used for determining an initial position for sending the code stream by the first server.

In an exemplary embodiment, the initial position is determined through negotiation performed by the second server with the first server according to the information of the first server.

Figure 10:
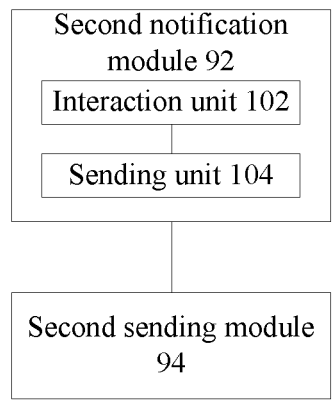
FIG. 10 is a structure block diagram of a second notification module 92 in a second code stream processing device according to an exemplary embodiment of the disclosure.

FIG. 10 is a structure block diagram of a second notification module 92 in a second code stream processing device according to an exemplary embodiment of the disclosure. As shown in FIG. 10, the second notification module 92 may include an interaction unit 102 and a sending unit 104. The second notification module 92 will be described below.

The interaction unit 102 may be configured to interact with the second server about real-time information of the code stream. The sending unit 104 may be coupled to the interaction unit 102, and may be configured to send a notification message to the first server according to the real-time information of the code stream. The notification message may be used for notifying the first server to acquire and cache the code stream which is substantially the same as the code stream of the second server, and the notification message may be further used for notifying the first server to acquire the initial position for sending the code stream, and after the second server stops sending the code stream, construct a message corresponding to the code stream and send the message starting from the initial position according to a source IP address of the second server.

In an exemplary embodiment, the notification message may notify the first server to acquire and cache the code stream which is substantially the same as the code stream of the second server in a manner of notifying the first server to acquire code stream information. The code stream information may include at least one of the following information: a source of the code stream, a protocol type of the code stream, a starting position of caching the code stream and information of the second server.

Figure 11:
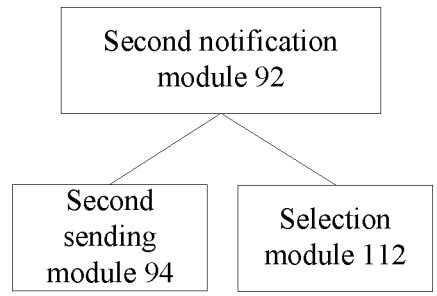
FIG. 11 is a first exemplary structure block diagram of a second code stream processing device according to an exemplary embodiment of the disclosure.

FIG. 11 is a first structure block diagram of a second code stream processing device according to an exemplary embodiment of the disclosure. As shown in FIG. 11, the device may further include a selection module 112, besides the modules shown in FIG. 9. The device will be described below.

The selection module 112 may be coupled to the second notification module 92, and may be configured to, after information indicating acquisition abnormity of the code stream is received from the first server, select a third server to replace the second server.

Figure 12:
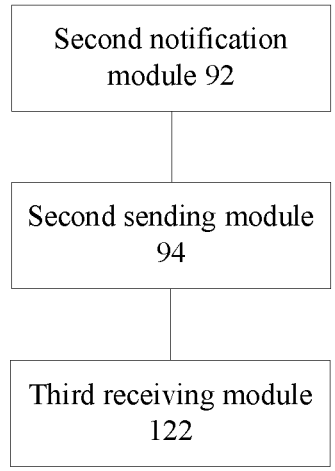
FIG. 12 is a second exemplary structure block diagram of a second code stream processing device according to an exemplary embodiment of the disclosure.

FIG. 12 is a second structure block diagram of a second code stream processing device according to an exemplary embodiment of the disclosure. As shown in FIG. 12, the device may further include a third receiving module 122, besides the modules shown in FIG. 9. The device will be described below.

The third receiving module 122 may be coupled to the second sending module 94, and may be configured to receive a sending result reported by the first server. The sending result is a sending result of sending the message by the first server.

Figure 13:
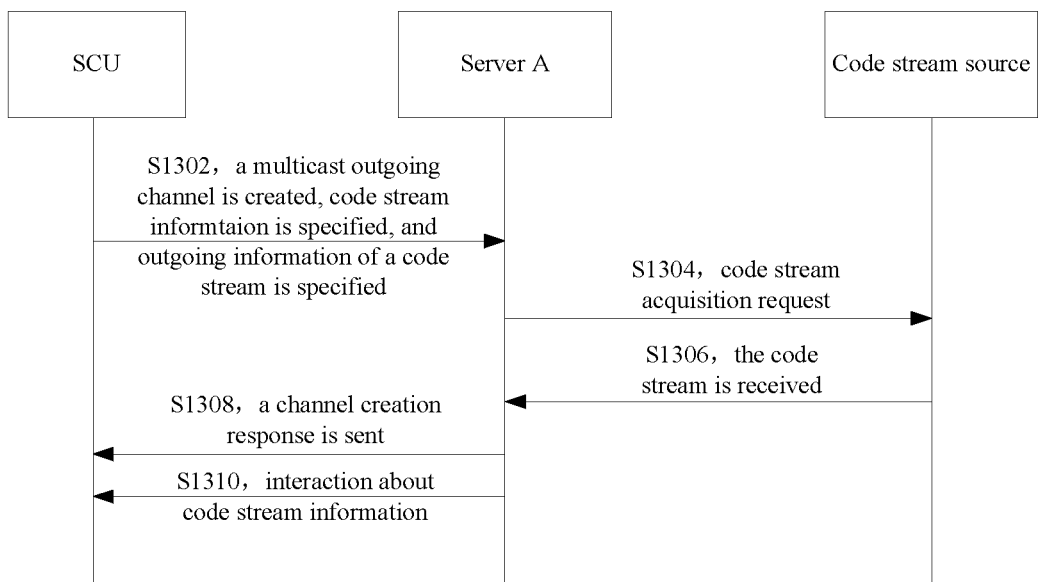
FIG. 13 is a schematic diagram of code stream introduction of a multicast outgoing channel.

FIG. 13 is a schematic diagram of code stream introduction of a multicast outgoing channel. As shown in FIG. 13, the flow may include the following acts:

At act S1302, an SCU may notify a server A (substantially the same as the abovementioned second server) to create a channel. Outgoing information of the channel may include an IP address and a port number. An ingoing direction of the channel may be a unicast code stream requiring an IP address, port and protocol access manner of a code stream source. The ingoing direction of the channel may alternatively be a multicast code stream requiring an IP address and port of a multicast group. The ingoing direction of the channel may also be a static file requiring information such as a file path and a reading manner. The server may send a code stream in an outgoing direction, and the server may receive a code stream in the ingoing direction.

At act S1304, the server A may start executing an operation of receiving a code stream according to information provided by the SCU.

At act S1306, after normally receiving a code stream, the server A may start code stream processing, for example, transcoding or recording, and may send the code stream in a form of multicast.

At act S1308, after normally receiving the code stream, the server A may reply the SCU with a channel creation result, and the SCU may record the result.

At act S1310, the SCU may interact with the server A about information of the code stream, for example, a timestamp and code stream importance description information. The importance description information may be an analysis result of the server A, may alternatively be statically provided by the SCU, and may alternatively be obtained by dynamic timestamp interaction. There are no limits made to provision manners of the importance description information.

An exemplary embodiment of the disclosure provides a method for seamlessly migrating a multicast channel. By virtue of the characteristic that a multicast code stream does not require a connection to be kept, a server B which will take over service (as an embodiment of the abovementioned first server) may acquire a code stream position determined by negotiation of an original server A (as an embodiment of the abovementioned second server) (the two servers may be in the same cluster), and construct a message from the position. The server B may simulate a source IP address of the server A as a source IP address, or continue sending the message in layer-2 message sending manner, to keep (S, G) of an intermediate link unchanged. Since multicast may require no connection and the message is continuous, a code stream receiving party may not perceive any change. (S, G) is a multicast tree entry, where S is a multicast source and G is a multicast group. The exemplary embodiment will be described below.

Figure 14:
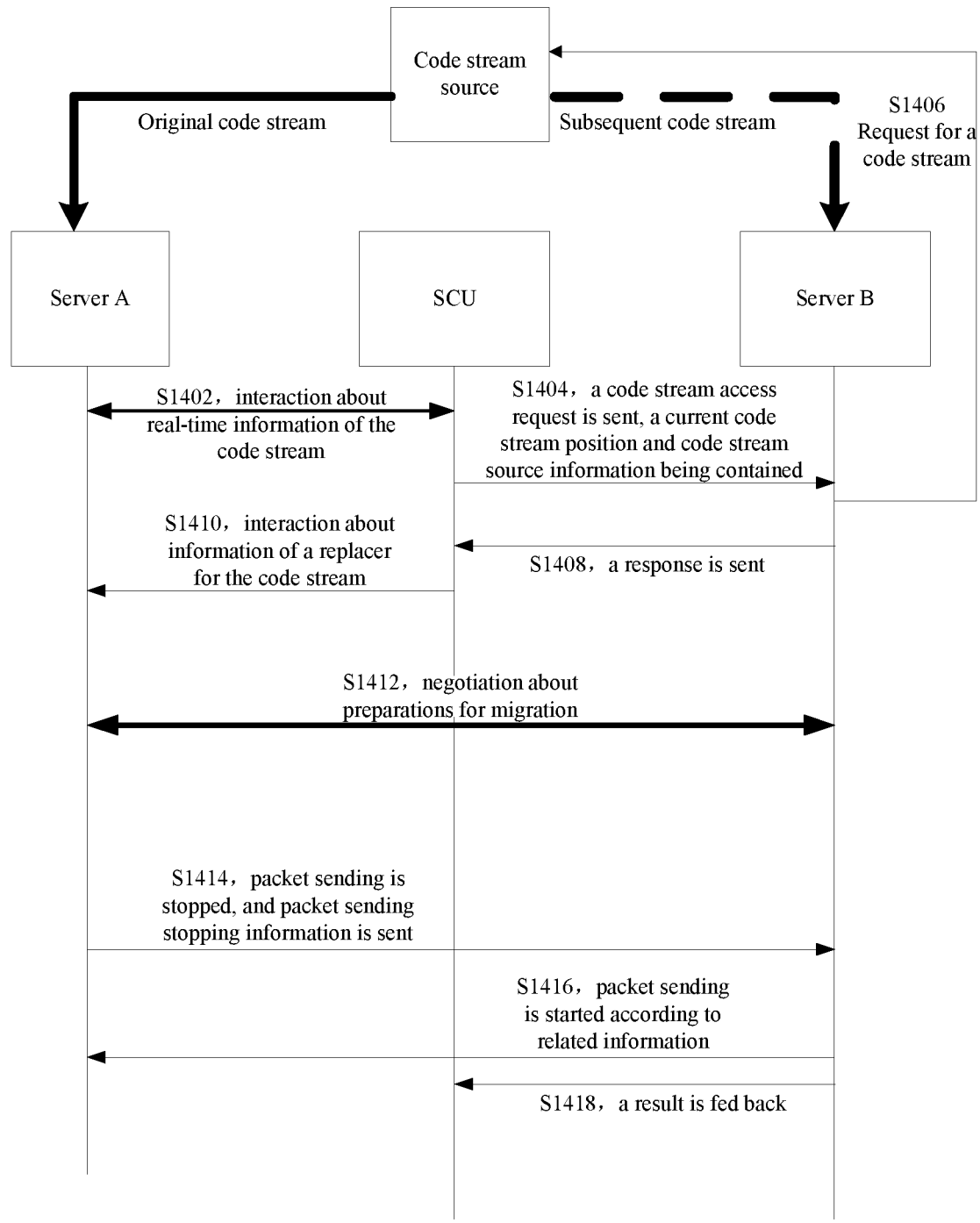
FIG. 14 is a schematic diagram of migration of a multicast outgoing channel according to an exemplary embodiment of the disclosure.

FIG. 14 is a schematic diagram of migration of a multicast outgoing channel according to an exemplary embodiment of the disclosure. As shown in FIG. 14, the flow may include the following acts:

At act S1402, an SCU may interact with a server A about real-time information of a code stream. The code stream may be a real-time code stream, for example, an outgoing code stream of a coder, and may alternatively be a static code stream, for example, a static file.

At act S1404, the SCU may notify a server B to add the corresponding code stream to ensure that the code stream accessed by the server B is substantially the same as the server A. The operation may include the following acts. The SCU may notify the server B to acquire the code stream. A notification message may include a source (IP address and port) of the code stream, a code stream transmission manner (protocol type), a corresponding position (approximate position where caching is started) and information of the server A. The server B may acquire and cache the same original code stream as the server A according to the notification. The code stream may be dynamically obtained from another server, for example, acquired from an outgoing multicast stream or unicast stream of the coder. The code stream may alternatively be acquired from a storage system, for example, reading the file with an offset by a position from a magnetic disk.

At act S1406, the server B may acquire and cache the code stream.

At act S1408, the server B may give a reply to the SCU after normal acquisition, and may stop in case of an abnormity, and the SCU may select another server for replacing the server A.

At act S1410, the SCU may notify the server A of information of a replacer according to the reply, and the preparation flow is completed.

At act S1412, the server A may negotiate with the server B according to selectable code stream positions. A low-importance position of the code stream may be usually selected. The server B may start work before simulated packet sending, for example, addition of a lo route, similar to e.g., ip route add local IP_A dev lo tab local, where IP_A is a source IP address of the server A for providing channel service. Since the two servers are in the same cluster, an outgoing network is the same, and the server B has a capability of sending a packet by virtue of IP_A. Alternatively, the server B may use a manner of constructing a layer-2 message, and may determine the source IP address of the server A as a source IP address of the message to simulate packet sending of the server A. The server A may return to the server B a checksum of a last original User Datagram Protocol (UDP) message to be sent of the channel and a last Real-time Transport Protocol (UTP) sequence number of the corresponding outgoing code stream. The negotiated position with low service importance may be an end or opening of a television drama or a competition, and may last for one or more messages, so as to improve stability and robustness when service is taken over. A code stream position weight table is code stream importance description information, and may be static, for example, analyzed specified file offset, or may be dynamic and change along with a timestamp, with forms and contents unlimited.

At act S1414, the server A may stop sending the code stream.

At act S1416, the server B may find the message corresponding to the channel from its own cache for caching according to a source IP address of the channel, a source port, a destination IP address and a destination port, then find the UDP message corresponding to the ingoing original code stream in the cache according to the checksum, transcode the UDP message and send the transcoded code stream by virtue of the acquired RTP message, the IP_A and a port specified by the SCU.

At act S1418, the server B may report a result to the SCU. This code stream may continue using the IP address and port of the server A, so that a user may not feel any change. The whole channel migration process is finished, and the subsequent code stream may be continuously provided by the server B. After the server A returns to normal, acts S1402 to S1418 may be repeated to migrate the code stream back.

In the whole process, the (S, G) entry of a multicast router does not change, and the user may perceive no changes in the source IP and the source port, just like that the whole code stream have never changed, so that the stability of the code stream is directly ensured, and a user experience is improved. By the technical solution in the abovementioned exemplary embodiment, the multicast outgoing channel may be conveniently migrated. For any service providing service data in a multicast manner, for example, a multicast channel directly providing direct broadcasting service and a multicast channel providing code stream relaying, this manner may be used. The code stream receiving party is freed from influence of regulation of upper-layer service, and a good code stream receiving effect may be achieved.

It is important to note that the modules may be implemented through software or hardware, and for the latter condition, may be implemented in, but not limited to, the following manner: the modules may be located in the same processor; or, the modules may be located in multiple processors respectively.

An exemplary embodiment of the disclosure provides a storage medium. In an exemplary embodiment, the storage medium may be configured to store program codes for executing the following acts.

At act S1, a first server may acquire and cache a code stream which is substantially the same as a code stream of a second server.

At act S2, the first server may acquire an initial position of the code stream.

At act S3, after the second server stops sending the code stream, the first server may construct a message corresponding to the code stream, and may send the message starting from the initial position according to a source IP address of the second server.

In an exemplary embodiment, the storage medium may be further configured to store program codes for executing the following acts:

At act S1, the second server may receive a message sent by an SCU. The message may be used for notifying the server that the first server may replace the second server to send the code stream.

At act S2, the second server may acquire the initial position for sending the code stream by the first server.

At act S3, the second server may stop sending the code stream according to the initial position.

In an exemplary embodiment, the storage medium may further be configured to store program codes for executing the following acts:

At act S1, the SCU may notify the first server to acquire and cache the code stream which is substantially the same as the code stream of the second server.

At act S2, after receiving, from the first server, information indicating normal acquisition of the code stream, the SCU may send the information of the first server to the second server.

In an exemplary embodiment, the storage medium may include, but not limited to: various media capable of storing program codes, such as a U disk, a ROM, a RAM, a mobile hard disk, a magnetic disk or an optical disk.

In an exemplary embodiment, specific examples in the exemplary embodiment may refer to the examples described in the abovementioned exemplary embodiments and optional implementation modes, and will not be elaborated in the exemplary embodiment.

Obviously, those skilled in the art should know that each module or each step of the disclosure may be implemented by a universal computing device, and the modules or acts may be concentrated on a single computing device or distributed on a network formed by a plurality of computing devices, and may optionally be implemented by program codes executable for the computing devices, so that the modules or acts may be stored in a storage device for execution with the computing devices, the shown or described acts may be executed in sequences different from those described here in some circumstances, or may form each integrated circuit module respectively, or multiple modules or acts therein may form a single integrated circuit module for implementation.

The above contents are only the exemplary embodiments of the disclosure and not intended to limit the disclosure.

INDUSTRIAL APPLICABILITY

Some exemplary embodiments of the disclosure may implement migration of a multicast channel without service interruption.

What is claimed is:

1. A message sending method, comprising:
acquiring and caching, by a first server, a code stream which is substantially the same as a code stream of a second server;
acquiring, by the first server, an initial position for sending the code stream; and
after the second server stops sending the code stream, constructing, by the first server, a message corresponding to the code stream, and sending, by the first server, the message starting from the initial position according to a source Internet Protocol (IP) address of the second server;
wherein acquiring, by the first server, the initial position for sending the code stream comprises: acquiring, by the first server, the initial position in a manner of negotiating with the second server; wherein the first server and the second server negotiate on a code stream location which is of low importance.

2. The method as claimed in claim 1, wherein sending, by the first server, the message according to the source IP address of the second server comprises:
adding, by the first server, a local route to send the message by virtue of the source IP address of the second server; or,
filling, by the first server, the source IP address of the second server into an IP address field of the message, and sending, by the first server, the message.

3. The method as claimed in claim 1, before acquiring and caching, by the first server, the code stream which is substantially the same as the code stream of the second server, further comprising:
receiving, by the first server, a notification message sent by a Service Control Unit (SCU), wherein the notification message is operative to notify the first server to acquire code stream information, the code stream information is used by the first server for acquiring and caching the code stream, and the code stream information comprises at least one of the following information: a source of the code stream, a protocol type of the code stream, a starting position of caching the code stream and information of the second server.

4. The method as claimed in claim 1, after acquiring and caching, by the first server, the code stream which is substantially the same as the code stream of the second server, further comprising:
notifying, by the first server, the SCU of an acquisition result of acquiring the code stream, wherein the acquisition result is used to indicate whether to reselect a server for replacing the second server or not to the SCU, and responsive to determining that it is not needed to reselect the server, the SCU sends information of the first server to the second server.

5. The method as claimed in claim 1, after constructing, by the first server, the message corresponding to the code stream and sending the message starting from the initial position according to the source IP address of the second server, further comprising:
reporting, by the first server, a sending result obtained after sending the message to the SCU.

6. The method as claimed in claim 1, wherein acquiring, by the first server, the code stream which is the same as the code stream of the second server comprises at least one of the following acts:
acquiring, by the first server, the code stream from another server except the second server; and
acquiring, by the first server, the code stream from storage equipment configured to store the code stream.

7. The method as claimed in claim 1, wherein acquiring, by the first server, the initial position for sending the code stream further comprises:
acquiring, by the first server, the initial position which is preset.

8. A code stream processing method, comprising:
receiving, by a second server, a message sent by a Service Control Unit (SCU), wherein the message is used for notifying the second server that a first server is to replace the second server to send a code stream;
acquiring, by the second server, an initial position for sending the code stream by the first server; and
stop sending, by the second server, the code stream at the initial position;
wherein acquiring, by the second server, an initial position for sending the code stream by the first server comprises: acquiring, by the second server, the initial position in a manner of negotiating with the first server; wherein the first server and the second server negotiate on a code stream location which is of low importance.

9. The method as claimed in claim 8, wherein receiving, by the second server, the message sent by the SCU comprises:
receiving, by the second server in a manner of interacting with the SCU about real-time information of the code stream, the message sent by the SCU, wherein the real-time information of the code stream is used by the SCU for sending a notification message to the first server, and the notification message is used for notifying the first server to acquire and cache the code stream which is substantially the same as the code stream of the second server, acquire the initial position for sending the code stream, and after the second server stops sending the code stream, construct a message corresponding to the code stream and send the message starting from the initial position according to a source Internet Protocol (IP) address of the second server.

10. The method as claimed in claim 9, wherein the notification message notifies the first server to acquire and cache the code stream which is substantially the same as the code stream of the second server in a manner of notifying the first server to acquire code stream information, and the code stream information comprises at least one of the following information: a source of the code stream, a protocol type of the code stream, a starting position of caching the code stream and information of the second server.

11. A code stream processing method, comprising:
notifying, by a Service Control Unit (SCU), a first server to acquire and cache a code stream which is substantially the same as a code stream of a second server; and
after receiving, from the first server, information indicating normal acquisition of the code stream, sending, by the SCU, information of the first server to the second server, wherein the information of the first server is used for determining an initial position for sending the code stream by the first server;
wherein the initial position is determined through negotiation performed by the second server with the first server according to the information of the first server; wherein the first server and the second server negotiate on a code stream location which is of low importance.

12. The method as claimed in claim 11, wherein notifying, by the SCU, the first server to acquire and cache the code stream which is substantially the same as the code stream of the second server comprises:
interact, by the SCU, with the second server about real-time information of the code stream; and
sending, by the SCU, a notification message to the first server according to the real-time information of the code stream, wherein the notification message is used for notifying the first server to acquire and cache the code stream which is substantially the same as the code stream of the second server, and the notification message is further used for notifying the first server to acquire the initial position for sending the code stream, and after the second server stops sending the code stream, construct a message corresponding to the code stream and send the message starting from the initial position according to a source Internet Protocol (IP) address of the second server.

13. The method as claimed in claim 12, wherein the notification message notifies the first server to acquire and cache the code stream which is substantially the same as the code stream of the second server in a manner of notifying the first server to acquire code stream information, wherein the code stream information comprises at least one of the following information: a source of the code stream, a protocol type of the code stream, a starting position of caching the code stream and information of the second server.

14. The method as claimed in claim 11, further comprising:
after receiving, from the first server, information indicating acquisition abnormity of the code stream, selecting, by the SCU, a third server to replace the second server.

15. The method as claimed in claim 12, after sending, by the SCU, the information of the first server to the second server, further comprising:
receiving a sending result reported by the first server, wherein the sending result is a sending result obtained after sending the message by the first server.

16. A message sending device comprising:
a server;
a first acquisition module, configured to acquire and cache a code stream which is substantially the same as a code stream of a second server;
a second acquisition module, configured to acquire an initial position for sending the code stream; and
a first sending module, configured to, after the second server stops sending the code stream, construct a message corresponding to the code stream, and send the message starting from the initial position according to a source Internet Protocol (IP) address of the second server;
wherein the second acquisition module is further configured to acquire the initial position in a manner of negotiating with the second server; wherein the first server and the second server negotiate on a code stream location which is of low importance.

17. A code stream processing device, applied to a second server and comprising:
a second receiving module, configured to receive a message sent by a Service Control Unit (SCU), wherein the message is used for notifying the second server that a first server is to replace the second server to send a code stream;
a third acquisition module, configured to acquire an initial position for sending the code stream by the first server; and
a stopping module, configured to stop sending the code stream at the initial position;
wherein the third acquisition module is further configured to acquire the initial position in a manner of negotiating with the first server; wherein the first server and the second server negotiate on a code stream location which is of low importance.

18. A code stream processing device, comprising:
a second notification module, configured to notify a first server to acquire and cache a code stream which is substantially the same as a code stream of a second server; and
a second sending module, configured to, after information indicating normal acquisition of the code stream is received from the first server, send the information of the first server to the second server, wherein the information of the first server is used for determining an initial position for sending the code stream by the first server;
wherein the initial position is determined through negotiation performed by the second server with the first server according to the information of the first server; wherein the first server and the second server negotiate on a code stream location which is of low importance.

* * * * *